Dec. 18, 1928.                     1,695,379
M. KECK
VEHICLE SUSPENSION
Filed June 16, 1923

Inventor
Max Keck.
By Walter F. Murray
Attorney

Patented Dec. 18, 1928.

1,695,379

UNITED STATES PATENT OFFICE.

MAX KECK, OF COVINGTON, KENTUCKY; CHRISTIAN KECK, ADMINISTRATOR OF MAX KECK, DECEASED, ASSIGNOR, BY DIRECT AND MESNE ASSIGNMENTS, OF ONE-EIGHTH EACH TO ALWINE KECK, OF KENTON COUNTY, KENTUCKY; JAMES J. FOLEY AND ALMA B. FOLEY, OF CINCINNATI, OHIO; MARTHA KECK, OF KENTON COUNTY, KENTUCKY, AND ONE-FOURTH TO JOSEPH J. STEVEE, OF KENTON COUNTY, KENTUCKY.

VEHICLE SUSPENSION.

Application filed June 16, 1923. Serial No. 645,896.

An object of my invention is to provide a vehicle body suspension wherein leaf springs and the like are eliminated.

Another object of my invention is to provide a structure of the type referred to wherein a floating suspension of the body may be attained.

Another object of my invention is to provide a device wherein vibration, shock and jar directed upon the wheels and axles are precluded from transmission to the vehicle body.

Another object of my invention is to provide a structure wherein the ends of the vehicle body are supported by the axles at the opposite ends of the vehicle body.

These and other objects are attained by the means described herein and disclosed in the accompanying drawings, in which.

Figure 1:
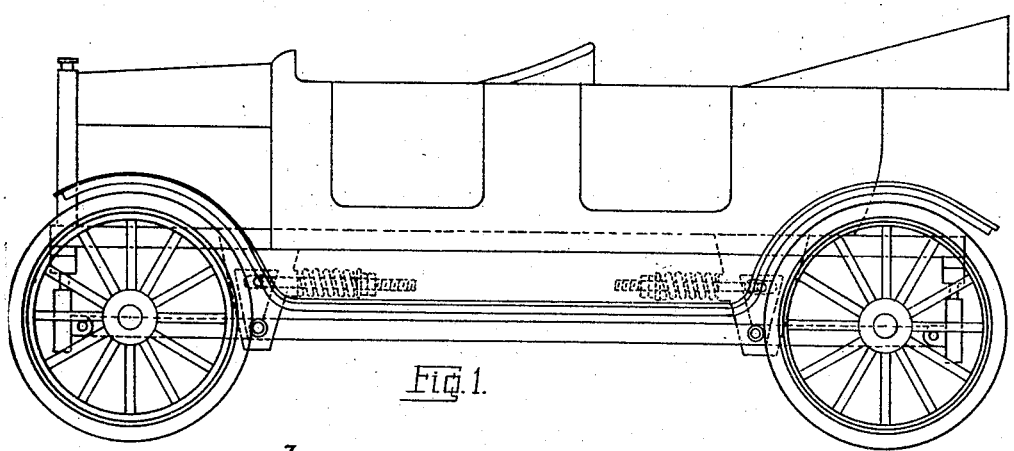
Fig. 1 is a side elevation of a vehicle having mounted upon it a device embodying my invention.
Figure 2:
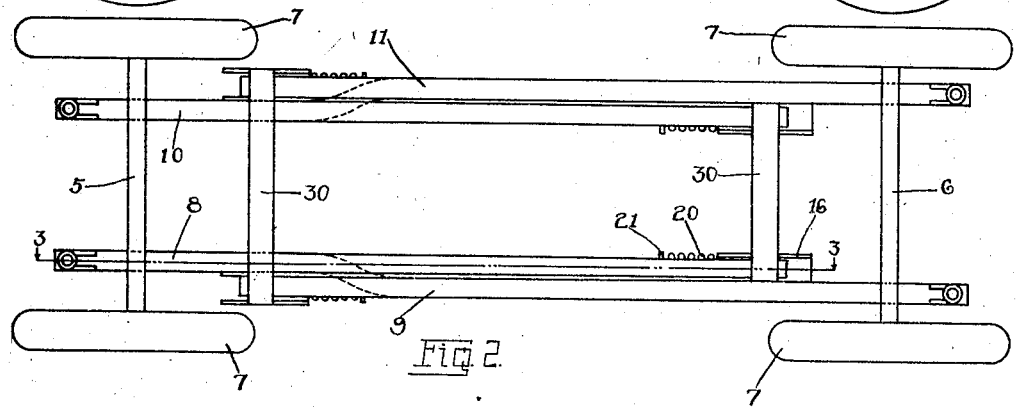
Fig. 2 is an inverted plan view of the device shown in Fig. 1, the body being eliminated.
Figure 3:
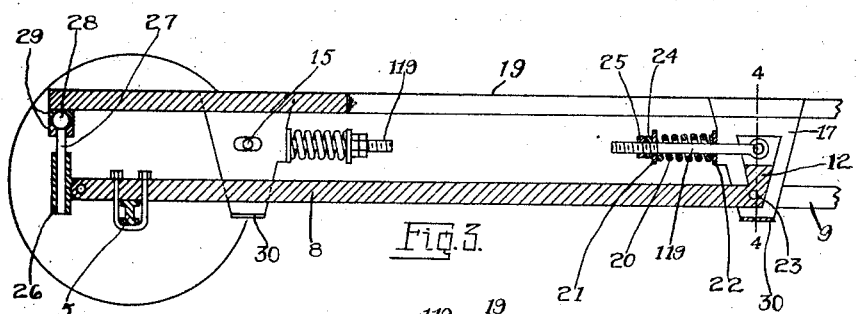
Fig. 3 is a fragmental sectional view on line 3—3 of Fig. 2.
Figure 4:
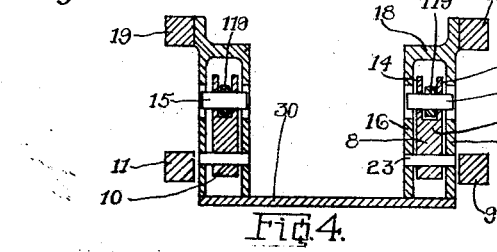
Fig. 4 is an enlarged sectional view on line 4—4 of Fig. 3.

The device embodying my invention comprises front and rear axles 5 and 6 carrying wheels 7 as is common practice. A pair of levers 8 and 9 are mounted at one side of the vehicle and a similar pair of levers 10 and 11 are mounted on the opposite side of the vehicle. The levers 8 and 10 carry the axle 5 adjacent their forward ends. The rear end of each of the levers 8 and 10 carries an upwardly extending bifurcated arm 12 between the branches 13 and 14 of which extends a pin 15. The rear end of each of said levers is contained between side plates 16 and 17 formed on the bracket 18 carried by and depending from the chassis 19. The side plates 16 and 17 carry a pin 23 upon which the rear end of each of said levers is pivotally mounted. A bolt 19 has an eye through which the pin 15 pivotally extends. A spring 20 is mounted on each bolt 19 and has its opposite ends in engagement upon a washer 21 adjustable longitudinally of the bolt 19 and upon a washer 22 in engagement upon the side plates 16 and 17 of the bracket. Suitable adjustment and locking nuts 24 and 25 carried by the bolt 19 permit variations of tension of the spring 20. Although I have shown but a single spring structure operating upon the lever, it is readily apparent that a plurality of springs may be used, and that any suitable device for effecting variations of resistance to movement of the lever may be employed, for example as shown in the patent to Price No. 1,300,022 or Godly No. 267,341. A bracket such as 18 is provided for each of the levers 8, 9, 10 and 11, and each of the levers are substantially identical both in structure and mounting upon the chassis and their respective axles. The free ends of each of the levers carry a pivotally mounted sleeve 26 in which is reciprocally contained a sliding bar 27 having a ball 28 formed at its upper end. The ball engages a suitable bearing block 29 carried by the chassis. The lower ends of the brackets disposed at the front end of the vehicle may be tied together in any suitable manner by cross-bar 30. A similar cross-bar may be employed to tie the brackets at the rear end of the vehicle. It should be noted that the levers carrying the forward axle 5 have their mounting upon the rear end of the chassis and that the levers carrying the rear axle 6 have their mounting upon the forward end of the chassis, in other words the rear end of the chassis is carried by the forward axle and the forward end of the chassis is carried by the rear axle. The pivotally mounted sleeve 26 together with the sliding bar 27 are provided for precluding lateral relative sway of the axles and the chassis and any other suitable means for accomplishing this purpose may be used in lieu of the structure disclosed. From the foregoing it will be apparent that various modifications of my invention may be employed without departing from the spirit of my invention, wherefore I do not limit myself to the specific forms and structure disclosed herein.

In the operation of my device, obstructions met by the front wheels have no effect upon the forward end of the chassis, wherefore there will be no resultant vibration or rocking between the front axle and the front end of the chassis. The impact directed upon the front wheels is absorbed by the spring 19 at the rear of the vehicle. It should be noted that the action of the lever and the spring in meeting impact directed upon the front wheels is such that no relative vibration or jolting between the rear end of the chassis and the rear ends of the levers 8 and 10 can result because the pivotal mounting of the rear ends of the levers 8 and 10 retain a fixed relationship to the chassis. From the foregoing it will be apparent that all of the shock must be met by the spring 20, and that a structure embodying my invention positively precludes any transmission of shock from the axles to the chassis and that all such shock must be and will be met by the yielding means, which in this application is illustrated as a spring 20, provided such yielding means is capable of and adjusted for performing this function properly.

What I claim is:

1. In a device of the class described the combination of a front and a rear axle, a chassis comprising depending brackets at its front and rear ends, bell crank levers each comprising a long and a short arm, each lever being pivotally mounted at the junction of its said arms to one of the brackets, the long arms of the levers extending longitudinally of the chassis and substantially from end to end thereof and having their free ends mounted upon the axles, and yielding means expansible and contractible in a plane substantially parallel with the horizontal planes extending longitudinally of the chassis and the levers and having a connection with the free ends of the shorter arms of the levers.

2. In a device of the class described the combination of a front and a rear axle, a pair of bell crank levers for each axle, each lever comprising a long and a short arm, the front axle being attached to the free ends of the long arms of one pair of levers and the rear axle being attached to the free ends of the long arms of the other pair of levers, a chassis, depending brackets carried by the chassis at the front and rear ends thereof, the levers supporting the front axle being pivotally supported by the brackets at the rear of the chassis and at the junction of the long and short arms of the levers, the levers carrying the rear axle being pivotally supported by the brackets at the front of the chassis and at the junction of the long and short arms of said levers, a bolt pivotally connected with the free end of each of the shorter arms of the levers, and a coiled spring on each bolt and bearing against its respective bolt and the bracket associated with the respective bolts for yieldingly resisting movement of the levers about their pivotal mountings on the brackets.

3. In a device of the class described the combination of a chassis provided at its front and at its rear with depending brackets, a pair of bell crank levers each comprising a long and a short arm pivotally mounted upon each bracket, the longer arms of each bracket extending longitudinally of the chassis and terminating adjacent the end of the chassis opposite to that end of the chassis on which such lever is pivotally supported, an axle at each end of the chassis and attached to the free ends of the longer arms of the levers, a bolt pivotally attached to the free end of each shorter arm of the lever, a spiral spring for each bolt and through which the respective bolts extend, and abutment means carried by each bolt and engaged by one end of its respective spring, the second end of the spring engaging its respective bracket.

4. In a device of the class described the combination of a chassis provided at its front and at its rear with depending brackets, a pair of bell crank levers each comprising a long and a short arm pivotally mounted upon each bracket, the long and short arms extending from one another at substantially a right angle, the longer arms of each bracket extending longitudinally of the chassis and terminating adjacent the end of the chassis opposite to that end of the chassis on which such lever is pivotally supported, an axle at each end of the chassis and attached to the free ends of the longer arms of the levers, a bolt pivotally attached to the free end of each shorter arm of the lever, a spiral spring for each bolt and through which the respective bolts extend, and abutment means carried by each bolt and engaged by one end of the spring, the second end of its respective spring engaging its respective bracket, the bolts extending in substantial parallelism with the chassis whereby movement of the levers about their pivotal mountings serves to reciprocate the bolts longitudinally of themselves and in parallelism with the chassis against the yielding influence of the springs.

5. In a device of the class described the combination of a chassis provided at its front and at its rear with depending brackets, a pair of bell crank levers each comprising a long and a short arm pivotally mounted upon each bracket, the longer arms of each bracket extending longitudinally of the chassis and terminating adjacent the end of the chassis opposite to that end of the chassis on which such lever is pivotally supported, an axle at each end of the chassis and attached to the free ends of the longer arms of the levers, a bolt extending from the shorter arm of each lever and a spiral spring carried by each bolt and operative upon the chassis and its respective lever for yieldingly resisting movement of the lever.

6. In a device of the class described the combination of a chassis provided at its front and at its rear with depending brackets, a pair of bell crank levers each comprising a long and a short arm pivotally mounted upon each bracket, the longer arms of each bracket extending longitudinally of the chassis and terminating adjacent the end of the chassis opposite to that end of the chassis on which such lever is pivotally supported, an axle at each end of the chassis and attached to the free ends of the longer arms of the levers, a bolt extending from the shorter arm of each lever, a spiral spring carried by each bolt and operative upon the chassis and its respective lever for yieldingly resisting movement of the lever, and means extending between the free ends of the levers and the chassis for precluding relative lateral motion of the chassis and axles.

7. In a device of the class described the combination of a front and a rear axle, a chassis comprising depending brackets at its front and rear ends, bell crank levers each comprising a long and a short arm, the arms extending from one another at substantially a right angle, each lever being pivotally mounted at the junction of its said arms to one of the brackets, the long arms of the levers extending longitudinally of the chassis and substantially from end to end thereof and having their free ends mounted upon the axles, and a compression spring pivotally mounted on the short arm of its respective lever, the compression spring having one end and abutment free whereby the shocks directed against the axles are absorbed by the spring and are not transmitted to the chassis.

8. In a device of the class described the combination of a chassis provided with depending brackets intermediate its ends, a front and a rear axle at the opposite ends of the chassis, a bell crank having a long and a short arm pivoted at the junction of the arms to each depending bracket, the arms extending from one another at substantially a right angle, the long arm of each bell crank extending in the direction of the length of the chassis and having its free end secured to an axle, and yielding means extending longitudinally of the chassis and the levers and having a connection with the free ends of the shorter arms of the levers, one end of the yielding means being free whereby the shocks directed against the axles are not transmitted to the chassis.

In testimony whereof, I have hereunto subscribed my name this 11th day of June, 1923.

MAX KECK.